United States Patent Office 2,996,302
Patented Aug. 15, 1961

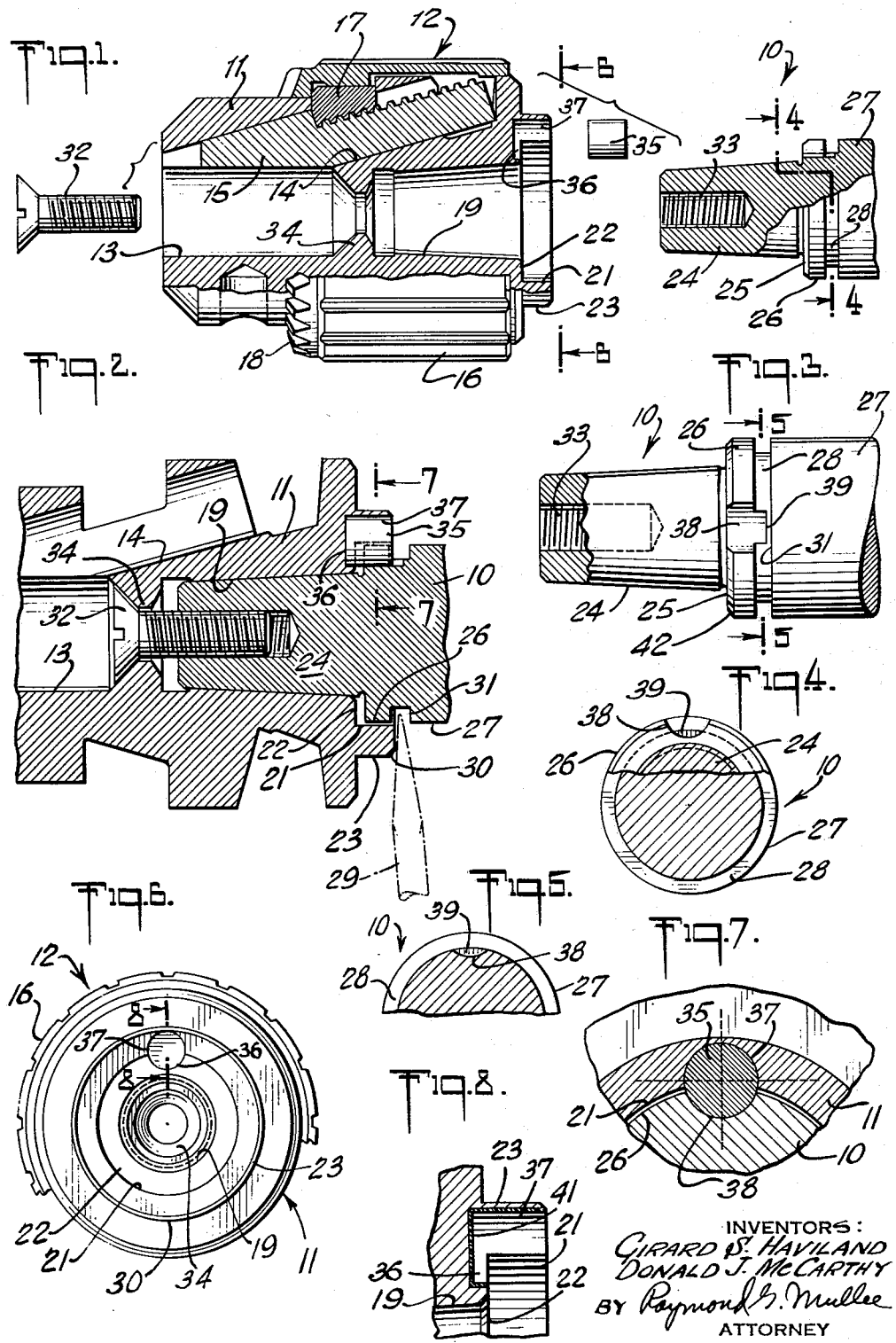

2,996,302
KEY DRIVE COUPLING FOR MACHINE SPINDLE
Girard S. Haviland, West Hartford, and Donald J. McCarthy, Wethersfield, Conn., assignors to The Jacobs Manufacturing Company, West Hartford, Conn., a corporation of New Jersey
Filed Nov. 10, 1959, Ser. No. 851,999
5 Claims. (Cl. 279—97)

This invention relates to a detachable connection between a driving and driven element, and more particularly, to an arrangement for supporting a chuck on a machine spindle.

Various means have been devised for attaching a chuck to the arbor or spindle which drives it. One form which has enjoyed limited success includes a tapered socket in the chuck body adapted to receive a complementary tapered portion on the spindle and thereby transmit the torque over a frusto-conical surface by reason of the tight frictional engagement. The tapered socket form of connection has certain advantages insofar as it centralizes the chuck in axial alignment with the spindle; it transmits the torque over areas which are symmetrically arranged and axially extended so that the chuck is dynamically balanced and stabilized with respect to the spindle; and it conserves space by permitting the driving element to project into the jaw enclosure; also it is operable in either direction of rotation as contrasted with the uni-directional screw threaded connection.

On the other hand, the tapered form of socket connection has disadvantages arising from the difficulty of controlling the frictional force of engagement within the socket. If the spindle is forced too tightly into the socket, the operator may have difficulty in separating the chuck from the spindle and may damage the chuck by using a hammer to dislodge it. On the other hand, if the connection is too loose, the friction drive will slip and the chuck and workpiece will stall under the operating load while the spindle continues to rotate.

It has been attempted to design a socket connection of this type with such a critical angle of taper that the connection will be tight enough to prevent slipping under the maximum operating load but not tight enough to prevent the operator from pulling the chuck off the spindle. However, the degree of tightness varies considerably under changing operating conditions with the result that the same structure may be so loose at one time that it slips and so tight at another time that it cannot be conveniently separated.

It is an object of this invention to retain the advantages of the tapered socket type of connection but to eliminate the disadvantages thereof.

Another object is the provision of a multiple driving connection between the spindle and the chuck body, including a friction drive which functions during ordinary conditions of operation and a positive key drive which functions when the chuck meets with resistance in excess of the frictional driving force.

A further object is to arrange the key drive so that it takes up a minimum of space and requires a minimum of attention during the operation of assembly and disassembly of the chuck with respect to the spindle.

In accordance with this invention, the chuck body is provided with a short counterbore which extends rearward from the tapered socket and which cooperates with a cylindrical surface on the spindle, and a key is interposed between the spindle and counterbore to positively lock them against relative rotation. The cylindrical surface on the spindle fits the counterbore thereby centralizing the chuck at its rear end and cooperating with the tapered socket to stabilize the chuck against the forces which tend to disaline it axially with respect to the spindle.

A feature of this invention resides in the shape of the key and of the complementary recesses in the chuck body and spindle which register with the key and which driving engagement therewith. The key is in the form of a short cylindrical pin or plug having an axial length only slightly more than that of the counterbore. The front end of the pin is completely encircled by the chuck body while the rear end of the pin is partly encircled by the counterbore recess. The latter extends around the pin for the major portion of its circumference whereby the inner end of the counterbore recess is narrower than the diameter of the pin with the result that the pin is locked against radial movement with respect to the chuck counterbore. Supplementary means may be provided for preventing the pin from moving axially relative to the chuck body. This arrangement enables the chuck and pin to be handled as a unit in the assembly and disassembly of the chuck with respect to the spindle.

Another feature of the invention consists of a shoulder on the spindle which provides a limit stop for the axial movement of the pin and thereby prevents the pin from becoming detached as long as the chuck body and spindle are assembled.

Another object of the invention is to facilitate detachment of the chuck from the spindle even though the latter is wedged tightly in the socket. In pursuance of this object, the body and the spindle are provided with annular shoulders so located relative to each other that the operator may pry the chuck body axially from the spindle, using a screwdriver to attain a high ratio of leverage in various positions extending circumferentially around the rear extremity of the chuck.

Other objects are to simplify the construction, reduce the manufacturing cost, prolong the life and minimize the dimensions, of the chuck body.

Other objects and features of the invention will appear more clearly from the following description taken in connection with the accompanying drawings and appended claims.

In the accompanying drawing, which illustrates one embodiment of the invention:

FIG. 1 is an exploded view, partly in section, showing the spindle, driving pin, chuck and retainer screw;

FIG. 2 is an enlarged longitudinal section of the coupling of this invention, including the spindle, driving pin, chuck body and retainer screw, all in assembled relation;

FIG. 3 is a plan view of the spindle;

FIG. 4 is a cross section through the spindle taken along the irregular line 4—4 in FIG. 3;

FIG. 5 is a fragmentary cross section through the spindle on the line 5—5 of FIG. 4;

FIG. 6 is a view of the rear end of the chuck as indicated by the arrows 6 in FIG. 1;

FIG. 7 is an enlarged cross section through the driving pin, showing a fragmentary portion of the spindle and chuck body, taken on the line 7—7 of FIG. 2; and FIG. 8 is a fragmentary longitudinal section, also enlarged, taken on the line 8—8 of FIG. 6.

In the illustrative coupling, the driving element comprises an arbor or spindle 10 which may be driven by any suitable source of power and which may form part of a machine tool or of a heavy duty portable electric drill (not shown). The driven element of the coupling is the body member 11 forming part of a chuck 12. The chuck body 11 has an axial bore 13 adapted for the reception of a work implement or drill (not shown). Extending rearwardly and outwardly from the axial bore are three inclined bores 14 (one being shown), each bore having a jaw 15 slidably mounted for reciprocation therein. Surrounding the chuck body 11 is a sleeve 16. Fixed within the sleeve is a nut 17, the inner surface of which is threaded for engaging complementary threads on each of the jaws 15. The sleeve is rotatable on the body 11 but is held against relative axial movement with the result that when the sleeve is turned the jaws move in unison lengthwise of the inclined bores to engage or disengage the implement. The sleeve may be rotated by hand and also by means of the usual gearing arrangement, including a bevel gear 18 integrally formed on the sleeve 16. The structure of the chuck 12 is conventional except for its means of attachment to the driving spindle, which means will be described presently.

The rear end of the body is provided with a tapered socket 19 and a counterbore 21, the latter being connected to the socket by an annular radial wall 22. In order to avoid interference with the jaws 15, the counterbore is formed in an annular boss 23 extending rearwardly from the main part of the chuck body. The tapered socket receives a complementary tapered portion 24 formed on the free end of the spindle 10. The taper as shown has such an angle that it provides a friction drive between the spindle and chuck body under some conditions of operation. Extending outwardly from the tapered portion 24 of the spindle is an annular radial wall 25 in confronting relation to the radial wall 22 on the body but spaced therefrom. The clearance space between the radial walls is desirable in order to provide manufacturing tolerance; to permit the entire axial thrust to be transmitted through the tapered connection; and, further, to permit the spindle to penetrate more deeply into the tapered socket 19 as the tapered connection becomes worn.

Extending rearwardly from the annular radial wall 25, the spindle has a cylindrical portion 26 which fits the counterbore 21. In order to reduce the manufacturing cost of the spindle, the cylindrical portion 26 is formed on a diameter equal to that of the main part 27 of the spindle, but is separated from the main part by an annular groove 28 with the parts in the assembled condition as shown in FIG. 2. The front end of the annular groove 28 extends up to and slightly beyond the rear end face of the boss 23 on the chuck body. This arrangement permits the operator to insert an implement such as a screwdriver 29 into the recess and pry the spindle loose from the chuck. The position of the screwdriver is shown in broken lines in FIG. 2 and it will be understood that the side of the screwdriver blade is fulcrumed on the outer edge 30 of the boss while the tip of the blade applies an axial pushing force to the radial wall 31 which defines the rear end of the annular groove 28.

In order to secure the tapered spindle portion 24 in tight frictional alinement with the tapered socket 19, a retainer means is provided. It comprises a screw 32 fitted within a threaded bore 33 at the front end of the spindle. The head of the screw has a conical portion seated against a countersunk surface provided on a radial wall 34 in the chuck body. The radial wall separates the axial bore 13 from the tapered socket 19 and is apertured to permit passage of the threaded portion of the screw through the wall. The front face of the retainer screw 32 is slotted for the reception of a screwdriver or similar implement and includes a flat portion which is adapted to abut against a workpiece (not shown) which is inserted between the jaws, and to act as a limit stop for the workpiece. When the chuck is assembled on the spindle, the operator may tighten the driving connection by turning the retainer screw 32 to pull the tapered spindle portion 24 into firm gripping engagement with the socket 19. As the driving connection becomes worn, or as the screw becomes loose due to vibration, the connection may be tightened further from time to time without disassembling the chuck from the spindle. When it is desired to disassemble the parts of the coupling, it is necessary, of course, to remove the retainer screw 32 before the screwdriver 29 is used to pry the spindle loose from the chuck body. The attachment of the chuck 12 to the spindle 10, or the removal therefrom, does not require the disassembly of one part of the chuck from any other part, although it may be necessary to adjust the jaws to the FIG. 1 position in order to provide access to the retainer screw 32 through the front end of the axial bore 13.

The friction driving connection between the spindle and chuck body, as described up to this point, will operate under moderate loads. However, when the chuck is subjected to excessive torsional thrusts and vibration, the frictional connection would yield or slip in the absence of a supplementary driving connection. Such a connection is provided by a driving key 35 located outside the tapered connection and at the rear end of the chuck body. As shown, the key is in the form of a short cylindrical plug or pin supported on an axis which is parallel to the axis of rotation. The front end of the pin is recived within a shallow bore 36 in the main part of the chuck body which lies just forward of the boss 23 and counterbore 21. The shallow bore completely encircles the front end of the pin 35. Rearwardly of the shallow bore, the pin is supported in an arcuate recess 37 formed in the side wall of the counterbore 21, the arcuate recess having an axial length equal to that of the counterbore and boss 23. The arcuate recess is a continuation of the shallow bore and is drilled along with the latter as a single machining opertion.

Referring to FIG. 7, the axis of the shallow bore and arcuate recess, and therefore of the pin which is received thereby, is so located with respect to the counterbore that the arcuate recess extends circumferentially for more than 180°. As a result, the mouth of the recess is considerably narrower than the diameter of the pin which fits the recess, thereby preventing the pin 35 from being displaced inwardly from the arcuate recess 37.

The spindle is provided with an arcuate recess 38 engaging the inner side of the pin 35 for less than the full axial length of the pin, and over an arc which extends less than 180° around the pin. The spindle recess starts at the front radial wall 25, extends through the cylindrical portion 26 and extends at least partway through the grooved portion 28, and terminates at its rear end in a shoulder 39. The shoulder acts as a positive stop to limit rearward movement of the pin and thereby co-operates with the arcuate recess 37 to retain the pin against accidental separation from the chuck body as long as the body is retained in assembled relation with the spindle. If desired, the annular groove 28 may be deepened, or the arcuate recess 38 lengthened, so that the radial wall 31 forms a limit stop for the pin. In either event, the limit stop should be spaced from the bottom of the shallow bore 36 by an axial distance slightly greater than the length of the pin 35 in order to provide manufacturing tolerances and to prevent interference with the penetration of the tapered spindle portion 24 into the tapered socket 19.

Ordinarily, however, the pin does not come into contact with the limit stop shoulder 39 as it is retained rigidly in assembled relation with the chuck body, seated at the bottom of shallow bore 36 as shown in FIG. 2. This rigid connection is desirable because it permits the pin to be assembled on, and disassembled from, the spindle 10 as part of the same operation of assembling or disassembling the chuck without requiring any separate movement of the pin relative to the chuck. As stated previously, the pin cannot move radially out of the arcuate recess 37, in which it fits snugly. Movement of the pin longitudinally of the arcuate recess may be inhibited by some conventional system such as staking. Preferably, however, this is accomplished by a plastic sealant 41 which is applied as a coat to the shallow bore 36 and arcuate recess 37 as shown in FIG. 8. Alternatively, the sealant may be applied after the pin is inserted in which event it will enter the very small spaces between the pin and the chuck body by capillary attraction. When the sealant hardens it will prevent the pin from coming out under ordinary operating conditions and enable the pin to be handled as a permanent part of the chuck.

In operation, let it be assumed that the operator desires to assemble the chuck 12 on the spindle 10. The elements of the coupling are then unattached in the condition shown in FIG. 1 except that the driving pin 35 has become permanently united to the chuck body 11 as just mentioned. The operator holds the chuck and spindle approximately in axial alinement and inserts the tapered end 24 of the spindle into the tapered socket 19 in the chuck body 11. The tapered socket acts as a funnel to aline the axes of the spindle and chuck more closely as the spindle penetrates further into the socket. Relative axial movement may be arrested by engagement of the rear end of pin 35 with the radial wall 25 at the front end of the cylindrical portion 26 of the spindle. In that event, the operator turns spindle 10 until the arcuate recess 38 is brought into alinement with the driving pin 35. By this time, the spindle and chuck body are so nearly in axial alinement that the cylindrical portion may be moved into bearing engagement within the counterbore 21. To facilitate entry of the cylindrical portion in the absence of precise axial alinement, the latter may be provided at its front end with a chamfer 42 (FIG. 3). To facilitate insertion of the pin 35 into the arcuate recess 38 in the absence of precise rotational alinement the recess may be formed on a radius slightly exceeding that of the pin. This difference in radii tends to introduce lost motion in the positive driving connection through the pin 35, but the lost motion ordinarily does not occur because it is inhibited by the friction driving connection between the spindle and socket.

At the same time that the driving pin 35 is moved into the spindle recess 38, the cylindrical portion 26 of the spindle is moved into the counterbore 21. There is a loose fit between the cylindrical portion and the counterbore which provides a centralizer for the spindle at a point remote from the front end of the spindle. The operator then continues the axial penetration of the spindle into the chuck body 11, first by the application of axial pressure, and later by inserting the retainer screw 32 and turning the screw in a tightening direction to pull the tapered portion 24 of the spindle into engagement with the tapered socket 19. With the tapered portion firmly seated in the socket, the spindle 10 is centralized at its front extremity as well as at its cylindrical portion, with the result that the chuck and spindle are connected in precise axial alinement and are firmly supported to resist any thrusts tending to disaline the axes. Preferably, the screw 32 is turned until the frictional engagement between tapered portion 24 and socket 19 is so tight that it provides all the torque required under ordinary operating conditions.

With the parts of the socket connection assembled, as shown in FIG. 2, the chuck is ready for use in the usual manner, that is by tightening and loosening the jaws 15 whenever it is desired to change a working implement and without disturbing the socket connection except when it is desired to replace the chuck, or occasionally when the connection loosens as a result of wear. During the operation of the chuck to drive a workpiece, the torsional force is transmitted for the most part through the tight frictional tapered connection and over the entire peripheral area of he tapered portion 24 of the spindle. As shown in FIG. 2, the tapered portion of the spindle penetrates deeply into the chuck body and far beyond the rear ends of the jaw receiving bores 14. The torque, therefore, is transmitted over areas which are widely spaced axially and which extend from the rear of the chuck to the middle. This arrangement stabilizes and centralizes the chuck on the spindle and minimizes the tendency to set up an unbalanced force or couple which might cause vibrations of the chuck and of the workpiece. When the workpiece meets with a sudden increase in resistance, however, the torque reaction sometimes develops suddenly to overcome the frictional holding force within the tapered socket and, in the absence of a supplementary driving means, would cause the socket connection to slip. This tendency is overcome by the driving pin 35 in combination with the arcuate recesses 37 and 38 which positively locks the spindle against rotation relative to the chuck 12.

By reference to FIG. 7, it will be seen that the torsional thrusts transmitted through the pin act in a radial inward direction and, therefore, act as a compressive force, and not as a shearing force. The pin is well supported against such compressive stresses and, therefore, may safely be designed with a relatively short length and small diameter without the danger of fatigue failure or rupture under shearing stress. By enabling the use of a small pin, this invention makes it possible to attain the desired driving action of the pin, without the accompanying disadvantage of materially increasing the size or bulk of the chuck.

If the tapered connection 19, 24 becomes loose as a result of wear or vibration, the operator tightens the retaining screw 32. In order to permit access to the screw, he may have to turn the sleeve 16 to withdraw the chuck jaws 15 to the FIG. 1 position.

When the operator desires to replace the chuck, he removes the retaining screw 32 to permit the spindle to be pulled out of the tapered socket 19 in the chuck body. In case the spindle is stuck, the operator then inserts a suitable implement such as the screwdriver 29 (FIG 2) into the annular groove 28, and then pries the spindle out of the socket as previously described. If the prying action does not result immediately in the unseating of the tapered connection 19, 24 it may be repeated by inserting the screwdriver in different positions extending almost 360° around the edge 30 of the boss 23.

From the foregoing description, it is seen that the driving elements through which torque is transmitted from the spindle to the chuck are symmetrically arranged so that the connection will function for the transmission of torque in either direction of rotation.

The invention is not limited to connections in which the driven element is a chuck, or a socketed member, but has general application and may be employed for example in a connection in which the socket member is the driving element and the spindle the driven element.

What is claimed is:

1. In a driving coupling comprising a spindle having a tapered portion at its front end, an annular radial wall extending outward from the rear end of the tapered portion, and having an enlarged portion extending rearwardly from the radial wall; a separate driven body member having a socket open at its rear end and tapering forwardly, said body member also having a counterbore at its rear end and having a radial wall connecting the counterbore to the socket; the tapered portion of the spindle being firmly seated in the socket and the radial walls of the spindle and counterbore being in confronting relation; the enlarged portion of the spindle being recessed within the counterbore of the body member; a cylindrical key having a length substantially equal to its diameter interposed between the enlarged portion of the spindle and the counterbored portion of the body member with its longitudinal axis parallel to the spindle axis, the internal wall of the counterbored portion having an axial keyway therein opening through the rear of the body member and transversely through the said internal wall, the key having a circumferential upper portion of a degree greater than half of the circumference of the key seated in the keyway with a slide fit and having its lower portion depending through the transverse opening, and the enlarged portion of the spindle having a transverse cavity therein in which a complementary circumferential portion of the lower depending portion of the key is seated, and plastic cement removably sealing the key in the keyway against endwise and rotary movement.

2. In a coupling according to claim 1, wherein the spindle has an annular narrow groove at the rear of the enlarged portion, and wherein the rear wall of the annular groove is spaced rearwardly of the rear extremity of the body member to permit the insertion of a thin rigid implement thereby to pry the spindle rearwardly out of the socket.

3. In a driving coupling comprising a spindle having a slightly tapered end portion, an annular radial flange terminating the rear of the tapered portion, a main spindle section having a diameter substantially equal to that of the flange, a reduced portion defining an annular groove between the flange and main spindle section, and the latter section having a forward radial wall defining a rear annular wall of the groove; and a separate driven body member having an annular boss extending axially from its rear and of reduced diameter, an outer recess extending axially in the boss having an axial depth slightly greater than the thickness of the flange and the latter being fully and closely received therein, an inner tapered recess of lesser diameter than the outer recess and extending from the latter axially into the body member, the tapered portion of the spindle being frictionally received in the inner recess; an arcuate keyway formed in the internal wall of the outer recess having an axis parallel to that of the spindle, the recess opening out through the rear of the boss and opening transversely of the internal wall for substantially its length into the outer recess, the keyway defining a circumferential wall of a little more than 180°, a cylindrical key having a radius and length complementing that of the keyway and slidably seated therein, a cylindrical surface portion of the key depending through the transverse opening of the keyway into the outer recess, and sealed in a complementary recess formed transversely of the periphery of the flange, and the rear annular radial wall of the groove being spaced from the rear of the boss a distance proximate to the thickness of a screw driver tip and adapted to admit the latter freely for prying the spindle free of the body member, the rear end of the boss serving as a fulcrum for the shank of the screw driver.

4. In a driving coupling as defined in claim 3, wherein there is slight clearance between the annular surface of the key and that of the keyway, and plastic cement disposed in said clearance removably seals the key fast in the keyway, whereby upon melting of the plastic the key may be slidably removed through the open rear end of the keyway for replacement.

5. In the combination of a driven body member having a tapered recess in a rear end thereof and having a coaxial counterbore rearwardly thereof of greater diameter than the tapered recess; and a spindle having a tapered end portion frictionally seated in the tapered recess and having an annular radial flange closely received in the counterbore; and a keyway arrangement keying the flange of the spindle to the body member, comprising a cylindrical key, a keyway having a radius complementing that of the key extending parallel to the axis of the spindle opening at its rear end through the rear of the body member and opening for substantially its length into the counterbore, the keyway having an internal annular wall of greater than 180 degrees serving as a seat for the key, the key being slidably received in the keyway and having a portion of less than 180 degrees and substantially equal to its length depending through the last mentioned opening of the keyway into the counterbore and seated in a complementary cavity formed in the periphery of the flange, and plastic cement removably sealing the key in the keyway.

References Cited in the file of this patent

UNITED STATES PATENTS

| | | |
|---|---|---|
| 1,403,064 | Ungar | Jan. 10, 1922 |
| 1,774,050 | Brown | Aug. 26, 1930 |
| 1,863,913 | Schmidt | June 21, 1932 |

FOREIGN PATENTS

| | | |
|---|---|---|
| 534,764 | France | Apr. 1, 1922 |